United States Patent
Chaubal et al.

(10) Patent No.: US 10,331,684 B2
(45) Date of Patent: Jun. 25, 2019

(54) GENERATING ANSWER VARIANTS BASED ON TABLES OF A CORPUS

(71) Applicant: International Business Machines Corporation, Armonk, NY (US)

(72) Inventors: Amrish V. Chaubal, Austin, TX (US); Kadriye E. Eyigoz, Austin, TX (US); Priscilla Santos Moraes, Pflugerville, TX (US); Ravi S. Sinha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 15/172,216

(22) Filed: Jun. 3, 2016

(65) Prior Publication Data

US 2017/0351677 A1    Dec. 7, 2017

(51) Int. Cl.
*G06F 16/248* (2019.01)
*G06F 16/2457* (2019.01)
(Continued)

(52) U.S. Cl.
CPC ...... *G06F 16/24578* (2019.01); *G06F 16/248* (2019.01); *G06F 16/285* (2019.01); *G06F 16/3344* (2019.01); *G06F 16/345* (2019.01)

(58) Field of Classification Search
CPC .......... G06F 17/2785; G06F 17/30684; G06F 17/30654; G06F 17/3053; G06F 17/30675;
(Continued)

(56) References Cited

U.S. PATENT DOCUMENTS

| 5,519,608 A | * | 5/1996 | Kupiec | G06F 17/3064 |
| | | | | 704/9 |
| 6,269,153 B1 | * | 7/2001 | Carpenter | H04M 1/645 |
| | | | | 379/88.02 |

(Continued)

OTHER PUBLICATIONS

Jawad Sadek, A Text Mining Approach for Arabic Question Answering Systems, School of Computing, Science and Engineering College of Science and Technology University of Salford, Salford, UK, 2014, all pages. (Year: 2014).*

(Continued)

*Primary Examiner* — Jay A Morrison
*Assistant Examiner* — Antonio J Caiado
(74) *Attorney, Agent, or Firm* — Stephen J. Walder, Jr.; William J. Stock

(57) ABSTRACT

Mechanisms are provided for implementing a candidate answer variant engine. The mechanisms receive an indication of a structured portion of content in a corpus, generate a plurality of groupings of elements of the structured portion of content, and generate, for each grouping of elements in the plurality of groupings of elements, and for each element in the grouping of elements, a corresponding grouping vector representation, corresponding to the element. The mechanisms, for each grouping vector representation of each grouping of elements in the plurality of groupings of elements perform a similarity measure calculation between the grouping vector representation and a vector representation of an input question, and select an element corresponding to the grouping vector representation for inclusion as a candidate answer variant based on results of the similarity measure calculation. The mechanisms perform question answering operations based on an analysis of one or more candidate answer variants.

20 Claims, 5 Drawing Sheets

(51) Int. Cl.
*G06F 16/28* (2019.01)
*G06F 16/33* (2019.01)
*G06F 16/34* (2019.01)

(58) Field of Classification Search
CPC ......... G06F 17/30864; G06F 17/30011; G06F 17/30522; G06F 17/3043; G06F 17/30389; G06F 17/30386; G06F 16/24; G06F 16/28; G06F 16/33; G06F 16/34; G06F 16/245; G06F 16/248; G06F 16/284; G06F 16/285; G06F 16/334; G06F 16/345; G06F 16/2457; G06F 16/3331; G06F 16/3344; G06F 16/24578
See application file for complete search history.

(56) References Cited

U.S. PATENT DOCUMENTS

| | | | |
|---|---|---|---|
| 7,792,829 B2 | 9/2010 | Brill et al. | |
| 8,275,803 B2 | 9/2012 | Brown et al. | |
| 9,135,396 B1* | 9/2015 | Kalinin | G06F 19/24 |
| 9,336,192 B1* | 5/2016 | Barba | G06F 17/277 |
| 2002/0065845 A1* | 5/2002 | Naito | G06F 16/33 |
| | | | 715/248 |
| 2003/0046277 A1* | 3/2003 | Jackson | G06F 16/30 |
| 2007/0022109 A1* | 1/2007 | Imielinski | G06F 17/30401 |
| 2007/0038602 A1* | 2/2007 | Weyand | G06F 17/30657 |
| 2009/0070311 A1* | 3/2009 | Feng | G06F 16/3329 |
| 2009/0287678 A1* | 11/2009 | Brown | G06F 17/28 |
| 2010/0185685 A1* | 7/2010 | Chew | G06F 16/334 |
| | | | 707/803 |
| 2011/0066587 A1 | 3/2011 | Ferrucci et al. | |
| 2011/0119282 A1 | 5/2011 | Gorman et al. | |
| 2011/0125734 A1 | 5/2011 | Duboue et al. | |
| 2012/0166439 A1* | 6/2012 | Poblete | G06F 16/958 |
| | | | 707/737 |
| 2012/0301864 A1* | 11/2012 | Bagchi | G09B 7/02 |
| | | | 434/362 |
| 2013/0006641 A1* | 1/2013 | Brown | G06F 16/3329 |
| | | | 704/270.1 |
| 2013/0007033 A1* | 1/2013 | Brown | G06F 17/28 |
| | | | 707/764 |
| 2013/0007055 A1 | 1/2013 | Brown et al. | |
| 2013/0018652 A1* | 1/2013 | Ferrucci | G06F 17/30507 |
| | | | 704/9 |
| 2013/0066886 A1 | 3/2013 | Bagchi et al. | |
| 2014/0258286 A1* | 9/2014 | Brown | G06F 17/30654 |
| | | | 707/728 |
| 2014/0280087 A1* | 9/2014 | Isensee | G06F 16/2455 |
| | | | 707/723 |
| 2015/0142418 A1 | 5/2015 | Byron et al. | |
| 2016/0019293 A1* | 1/2016 | Bhagwat | G06F 17/30684 |
| | | | 707/732 |
| 2016/0055155 A1* | 2/2016 | Allen | G06F 17/3043 |
| | | | 707/749 |
| 2017/0235820 A1* | 8/2017 | Conrad | G06F 17/2211 |
| | | | 707/728 |
| 2017/0249311 A1* | 8/2017 | Pelleg | G06N 5/04 |
| 2017/0351750 A1* | 12/2017 | Rokhlenko | G06F 16/9535 |

OTHER PUBLICATIONS

Zhang et al., A Topic Clustering Approach to Finding Similar Questions from Large Question and Answer Archives, PLOS, Derek Abbott, University of Adelaide, Australia, Published Mar. 4, 2014, all pages. (Year: 2014).*
"Cosine similarity", Wikipedia, https://en.wikipedia.org/wiki/Cosine_similarity, accessed on Apr. 28, 2016, 5 pages.
High, Rob, "The Era of Cognitive Systems: An Inside Look at IBM Watson and How it Works", IBM Corporation, http://ip.com/pdf/redbook/REDP495500.pdf, Dec. 12, 2012, 16 pages.
McCord, M.C. et al., "Deep parsing in Watson", IBM J. Res. & Dev. vol. 56 No. 3/4 Paper 3, May/Jul. 2012, pp. 3:1-3:15.
Yuan, Michael J., "Watson and healthcare, How natural language processing and semantic search could revolutionize clinical decision support", IBM developerWorks, IBM Corporation, Apr. 12, 2011, 14 pages.

* cited by examiner

|  | YEAR | SALARY | POSITION |
|---|---|---|---|
| John Smith | 2015 | $50,000.00 | Engineer |
| Mary Jones | 2014 | $65,000.00 | Manager |

*FIG. 4A*

|  | AS OF DECEMBER 31 | | |
|---|---|---|---|
|  | 2010 | 2011 | 2012 |
| COMPANY ABC | $100,000.00 | $165,000.00 | $210,000.00 |
| COMPANY XYZ | $50,000.00 | $100,000.00 | $65,000.00 |

*FIG. 4B*

GENERATING ANSWER VARIANTS BASED ON TABLES OF A CORPUS

BACKGROUND

The present application relates generally to an improved data processing apparatus and method and more specifically to mechanisms for generating answer variants based on tables of a corpus.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

While cognitive systems, such as QA systems, natural language processing systems, and the like, provide useful tools, they have limitations when it comes to some types of content. In particular, many cognitive systems are unable to properly process structured portions of content, such as table data structures, and instead are left to ignoring those portions that are unable to be processed as natural language.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions executed by the processor to cause the processor to implement a candidate answer variant engine. The method comprises receiving, by the candidate answer variant engine, an indication of a structured portion of content in a corpus, generating, by the candidate answer variant engine, a plurality of groupings of elements of the structured portion of content, and generating, by the candidate answer variant engine, for each grouping of elements in the plurality of groupings of elements, and for each element in the grouping of elements, a corresponding grouping vector representation, corresponding to the element. The method further comprises, for each grouping vector representation of each grouping of elements in the plurality of groupings of elements: (1) performing, by the candidate answer variant engine, a similarity measure calculation between the grouping vector representation and a vector representation of an input question; and (2) selecting, by the candidate answer variant engine, an element corresponding to the grouping vector representation for inclusion as a candidate answer variant in a candidate answer variant data structure based on results of the similarity measure calculation. Moreover, the method comprises performing question answering operations for answering the input question based on an analysis of one or more candidate answer variants in the candidate answer variant data structure.

The structured portion of content may comprise a table data structure present in a portion of content of the corpus. In such embodiments, each grouping of elements in the plurality of grouping of elements may comprise a triad of at least one row header, at least one column header, and cell content. This allows table data structures to be processed to identify candidate answer variants (CAVs) based on content present in headers and cells of the table data structure.

In some illustrative embodiments, the structured portion of content is a structured portion of content corresponding to a candidate answer found in the corpus by a primary search operation of a question answering (QA) system. In this way, the primary search operation of the QA system is able to focus CAV searching to those structured portions of content that are associated with other potential answers to the input question and thus, are more likely to provide CAVs.

In some illustrative embodiments, performing the similarity measure calculation comprises calculating a cosine similarity between the grouping vector representation and the vector representation of the input question. The similarity measure calculation may comprise calculating the cosine similarity between other elements of the grouping vector representation than an element of the grouping vector representation being considered for selection as a candidate answer variant from the grouping of elements. By utilizing cosine similarity measures, a measure of similarity between natural language elements may be used generated that provides good results in determining what elements of a structured portion of content are similar to elements of an input natural language content, such as an input question.

Selecting the element corresponding to the grouping vector representation for inclusion as a candidate answer variant in the candidate answer variant data structure based on results of the similarity measure calculation may comprise comparing a cosine similarity value calculated as the cosine similarity between the other elements of the grouping vector representation and the vector representation of the input question, with a threshold value, and selecting the element being considered for selection as a candidate answer variant to be a candidate answer variant in response to the cosine similarity value having a predefined relationship with the threshold value. In this way, these illustrative embodiments utilize cosine similarity to identify elements in the structured portion of content that are similar to the features of the input question and are likely potential answers to the input question.

In some illustrative embodiments, generating a plurality of groupings of elements of the structured portion of content may comprise analyzing at least one of metadata or computer code associated with the structured portion of content to identify a structure of the structured portion of content, identifying elements of the structure based on the analysis, and generating groupings of elements based on the identified elements and the identified structured of the structured portion of content. In this way, these illustrative embodiments leverage the structure information available in metadata and computer code to assist with the defining of groupings of elements used to identify candidate answer variants.

In some illustrative embodiments, the vector representation of the input question comprises a vector representation of one or more features of the input question identified by a natural language processing of the input question. Thus, the features may be represented in such a way that these features may be compared to elements of structured content to determine similarities using vector operations.

In some illustrative embodiments, the similarity measure calculation comprises at least one of a textual syntactic similarity measure calculation or textual semantic similarity measure calculation. Thus, the mechanisms of these illustrative embodiments may utilize various measures of textual syntactic similarity and/or textual semantic similarity to determine which elements of structured content are similar to features of an input question.

In some illustrative embodiments, performing question answering operations for answering the input question based on an analysis of one or more candidate answer variants in the candidate answer variant data structure may comprise: generating, for each candidate answer variant in the candidate answer variant data structure, a confidence score value indicating a confidence that a corresponding candidate answer variant is a correct answer for the input question; ranking the candidate answer variants relative to one another, and to other candidate answers found during a primary' search operation of a question answering (QA) system, based on the generated confidence scores to generate a ranked listing data structure; selecting at least one final answer from the ranked listing data structure; and outputting the at least one final answer to a source of the input question. Thus, with these illustrative embodiments, the candidate answer variant mechanisms are used to augment the functionality of a QA system to facilitate performance of the QA system's operations on an expanded set of candidate answers that comprise candidate answer variants identified in structured content portions which otherwise would not have been available due to prior art limitations of natural language processing with regard to structured content portions.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B are example diagrams of table data structures which may be present in documentation of a corpus and which may be utilized to generate answer variants in accordance with one illustrative embodiment.

DETAILED DESCRIPTION

Figure 1:
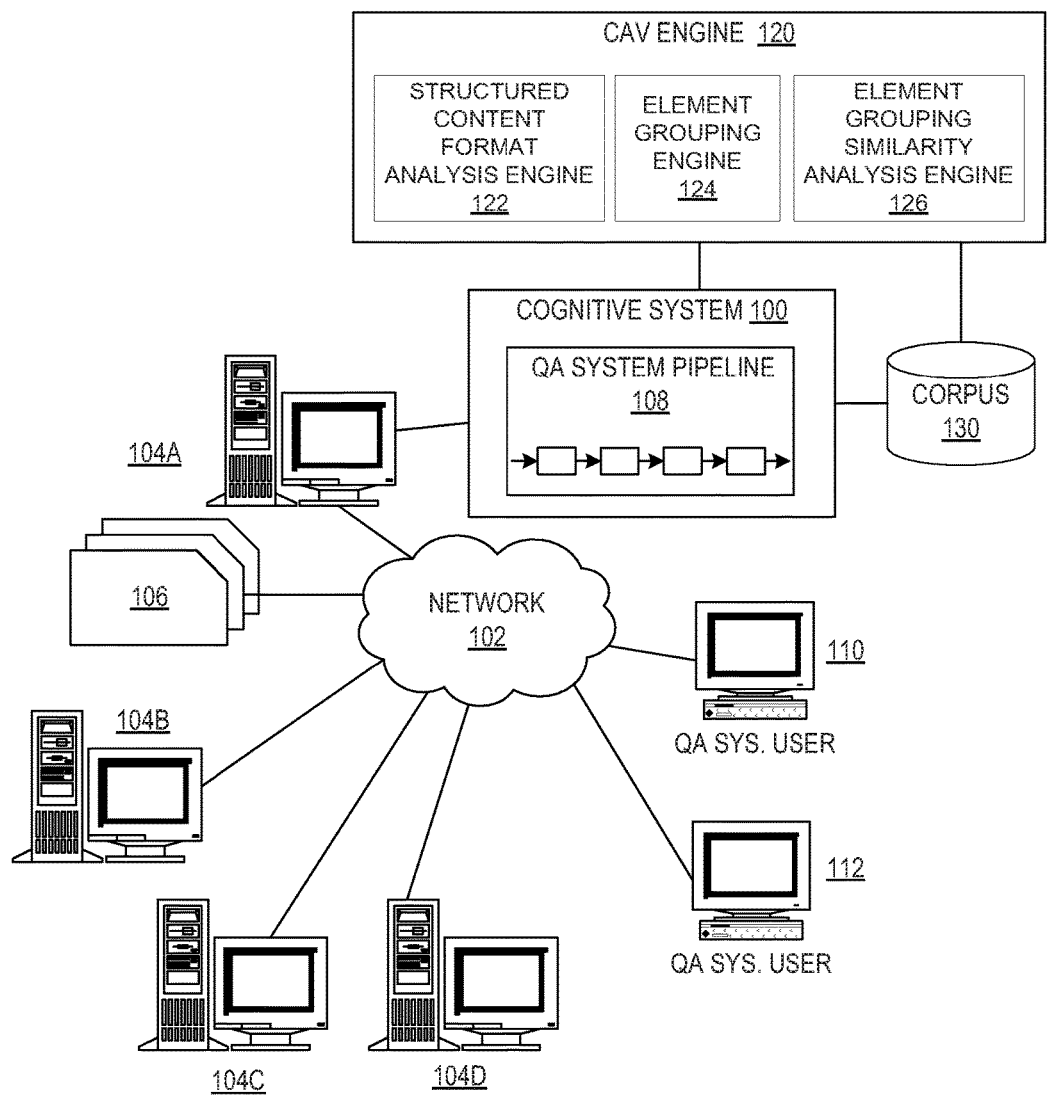
FIG. 1 depicts a schematic diagram of one illustrative embodiment of a cognitive system in a computer network.

The illustrative embodiments provide mechanisms for generating answer variants for candidate answers to an input question based on table structures in a corpus of documentation ingested by a cognitive system. The recent trends with regard to cognitive systems, and in particular question answer (QA) systems; is to provide cognitive functionality with unstructured natural language content. For example, a QA system such as IBM Watson™ ingests unstructured natural language content as part of a corpus of documentation, annotates the unstructured natural language content with metadata identifying various features of the unstructured natural language content, generates an in-memory representation of the unstructured natural language content, such as a graph of the concepts and their relationships, and utilizes the in-memory representation and the associated metadata to perform question answering operations. Because the input to these cognitive systems is unstructured, various mechanisms for determining alternative answers to input question are utilized including, for example, synonym data structure based analysis for identifying synonyms for candidate answers, alternative input question form generation that focuses on generating alternative versions of an input question and then merging candidate answers generated from multiple alternative versions to generate a final set of candidate answers, use of multiple QA system pipelines performing different types of analysis, e.g., trained using different sets of training input questions and answers, etc.

It should be appreciated that even with a corpus or corpora of unstructured natural language content, this unstructured natural language content may comprise portions that comprise structured content. For example, it is common place in many domains, such as the medical domain, financial domain, scientific domains, sports domains, and the like, to have tables of information, i.e. structured content, embedded within unstructured natural language content. For example, natural language documents directed to the sports domain may have embedded table data structures that describe various sporting statistics, e.g., batting averages for baseball players, salaries for various professional athletes, etc. Known cognitive systems utilizing natural language processing techniques often are not able to understand the content within such tables and structured content and essentially ignore the presence of this structured content. Recently, mechanisms have been developed for analyzing such structured content portions within unstructured natural language content, e.g., U.S. Pat. No. 9,286,290 and U.S. patent application Ser. No. 14/834,810, in order to use these structured content portions as potential sources for answers to input questions.

The illustrative embodiments described herein are directed to generating alternative or variants of candidate answers to an input question based on analysis of structured content portions of evidence passages from a corpus or corpora. In some illustrative embodiments, the mechanisms perform a primary search of the corpus to generate candidate answers to an input question. During the primary search of the corpus, table data structures may be identified as being present in the corpus. The mechanisms of the illustrative embodiments, rather than ignoring the table data structures as not able to be processed using natural language processing techniques, process the headers and cell values of table data structures within a corpus to identify candidate answer variants (CAVs). These CAVs are additional candidate answers referred to as variants because they may be associated with table data structures in portions of content where a primary search candidate answer is found.

The processing of the table data structure involves constructing groupings, e.g., triads in some illustrative embodiments, of table headers and cell values and evaluating these groupings using similarity measures to measure the similarity of the elements of the grouping to features of the input question. In some illustrative embodiments, this similarity measure is generated using cosine similarity calculations on vectors representing the elements of the groupings and features of the input question. Cosine similarity is generally known in the art and thus, a detailed description of cosine similarity will not be provided herein other than to reference publicly available information regarding cosine similarity on the Internet at various web pages including Wikipedia. However, cosine similarity measures have not been previously utilized to assist with generating candidate answer variants based on the content of a structured portion of content in a corpus, as in the present invention.

Each element of the grouping is a potential CAV for the input question. Thus, in order to evaluate the suitability of an element in the grouping as a CAV, the other elements of the group are evaluated with regard to calculating a similarity measure relative to the input question. In other words, the element is taken as a candidate answer to the input question and the other elements of the grouping are considered "evidence" for evaluating the candidate answer. Similarity measures between these other "evidence" elements and the features of the input question are calculated and if the similarity measure(s) meet or exceed a threshold level of similarity, then the element is considered a valid CAV for the input question. Such evaluation of similarity measures may involve a strict evaluation in which all of the similarity measures calculated for each of the "evidence" elements must meet or exceed the threshold level of similarity, a relaxed evaluation in which any one of the similarity measures calculated for each of the "evidence" elements meets or exceeds the threshold level of similarity, or a hybrid approach involving both strict and relaxed evaluations, as described hereafter. It should be appreciated that this processing of the grouping may be repeated for each potential CAV in the grouping with the other elements of the grouping being considered the "evidence" elements for evaluating the CAV.

The CAVs identified from the structured content portion, e.g., table data structure, may be added to the listing of candidate answers generated by the primary search performed by the QA system for further evaluation. That is, the CAVs are treated as other candidate answers and are thus, evaluated based on evidential passage scoring to generate confidence scores associated with the candidate answer (or CAV), the candidate answers are merged and ranked according to confidence scores, one or more final answers are selected from the ranked listing of candidate answers, and the one or more final answers are output as one or more answers to the input question, potentially along with additional information including confidence score values, supporting evidential passages, and the like.

Thus, the illustrative embodiments provide mechanisms for identifying candidate answer variants (CAVs) from structured content portions in a corpus, whether those structured content portions are separate portions of the corpus or embedded in unstructured content, e.g., natural language documents. These CAVs are evaluated based on similarity measures to select a set of CAVs for inclusion in a set of candidate answers to an input question which are then evaluated using QA system mechanisms based on evidence present in the corpus or corpora. Through the use of the mechanisms of the illustrative embodiments, the performance of the QA system is improved as has been determined by implementation of these mechanisms such that improved accuracy and recall of a QA system is achieved. Recall is a statistical measure that measures the ability of the QA system to obtain the right answer as one of the candidate answers. Accuracy is a statistical measure of how often the QA system ranks the correct answer as a top ranking answer in the candidate answers.

Before beginning the discussion of the various aspects of the illustrative embodiments in more detail, it should first be appreciated that throughout this description the term "mechanism" will be used to refer to elements of the present invention that perform various operations, functions, and the like. A "mechanism", as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product, The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart, or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
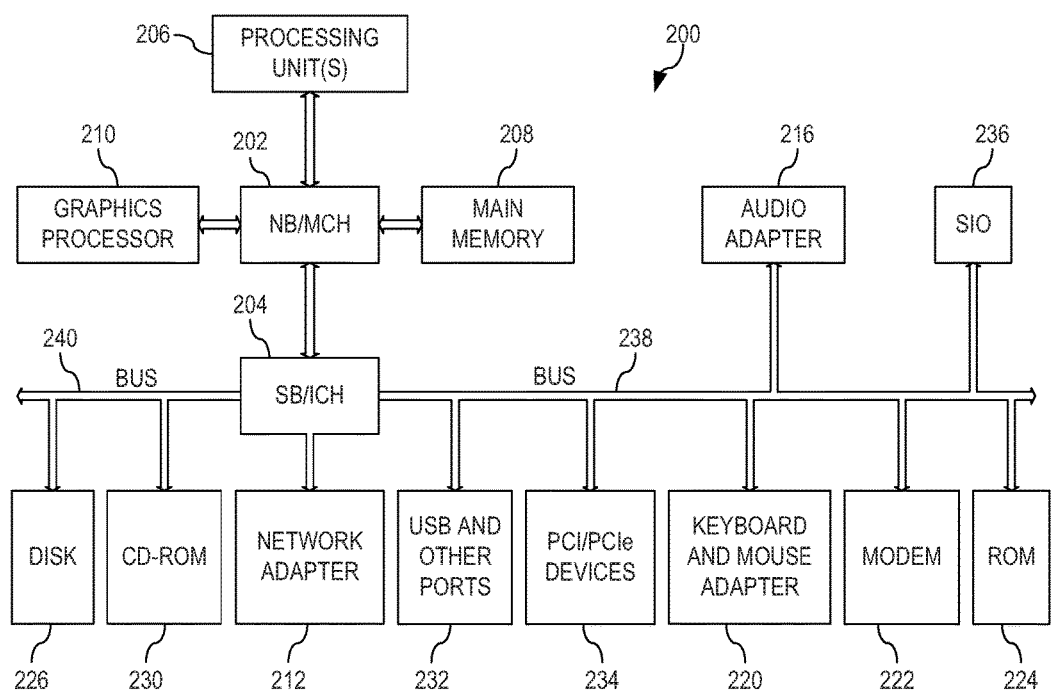
FIG. 2 is a block diagram of an example data processing system in which aspects of the illustrative embodiments are implemented.
Figure 3:
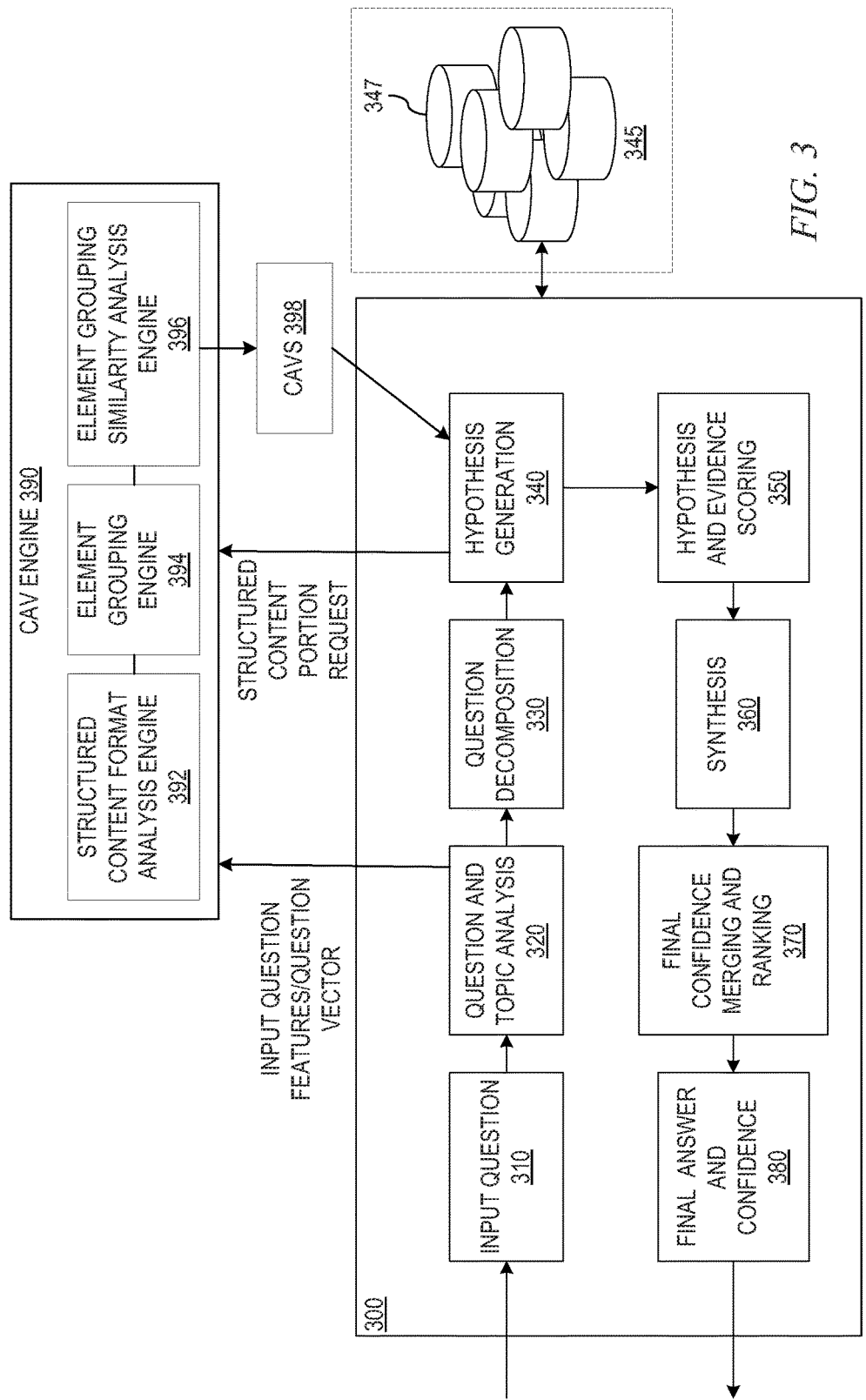
FIG. 3 illustrates a QA system pipeline, of a cognitive system, for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. The QA pipeline is part of a QA system that may be implemented in the cognitive system. The cognitive system, while shown as having a, single QA pipeline, may in fact have multiple QA pipelines. Each QA pipeline may be separately trained for answer input questions of a different domain or be configured to perform the same or different analysis on input questions, depending on the desired implementation. For example, in some cases, a first QA pipeline may be trained to operate on input questions in a financial domain while another QA pipeline may be trained to answer input questions in a medical diagnostics domain or sports domain. Moreover, each QA pipeline may have their own associated corpus or corpora that they ingest and operate on, e.g., one corpus for financial domain documents and another corpus for medical diagnostics domain related documents in the above examples. In some cases, the QA pipelines may each operate on the same domain of input questions but may have different configurations, e.g., different annotators or differently trained annotators, such that different analysis and potential answers are generated. The QA system may provide additional logic for routing input questions to the appropriate QA pipeline, such as based on a determined domain of the input question, combining and evaluating final answers generated by multiple QA pipelines, and other control and interaction logic that facilitates the utilization of multiple QA pipelines.

As will be discussed in greater detail hereafter, the illustrative embodiments are integrated in, augment, and extend the functionality of these QA mechanisms of the cognitive system with regard to generating candidate answer variants (CAVs) from structured portions of content, e.g., table data structures, graph data structures (which may be converted to table data structures), or any other structured portion of content from which a grouping as described herein may be generated. The illustrative embodiments improve the operation of the cognitive system and/or QA mechanisms of such a cognitive system by augmenting the primary search for an answer to an input question by providing additional candidate answers, or variants of candidate answers found during the primary search, for evaluation against evidence passages present in the corpus or corpora. The illustrative embodiments select such candidate answer variants (CAVs) using an intelligent selection process that evaluates groupings of elements from the structured content portion, where the groupings are based on the structure or format of the structured content portion and each element within a grouping is a potential CAV. Each of the elements of a grouping are evaluated as a potential CAV with the other elements of the grouping acting as evidence elements for evaluating the suitability of the potential CAV as an actual CAV for use in answering the input question. The evidence elements are evaluated using a similarity measure against the features of the input question to determine if the potential CAV is suitable for use as an actual CAV to be output to the QA system for further evaluation using evidential passages from the corpus/corpora to generate confidence scores; perform ranking of candidate answers, and perform selection of one or more final answers to the input question.

Since the mechanisms of one or more of the illustrative embodiments are directed to improving the operation of a cognitive system implementing one or more QA system pipelines, it is important to first have an understanding of how question and answer processing in a cognitive system implementing a QA pipeline is performed before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice (memorization and recall))
- Predict and sense with situational awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is interred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104A-104D (comprising one or more processors and one or more memories, and potentially any other computing device elements generally known in the art including buses, storage devices, communication interfaces, and the like) connected to the computer network 102. The network 102 includes multiple computing devices 104A-104D in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104A-104D include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a candidate answer variation (CAV) engine 120. The CAV engine 120 operates to augment the candidate answers generated by way of a primary operation of the QA system pipeline 108, as will be described hereafter with regard to FIG. 3, to provide alternative candidate answers, or variants of candidate answers generated by the primary operation of the QA system pipeline 108, based on analysis of structured content portions in the corpus 130. That is, during the primary search of the corpus 130, structured portions of content, assumed hereafter to be table data structures for ease of explanation, may be identified as being present in the corpus 130. As described herein, in accordance with one or more of the illustrative embodiments, the headers and cell values of table data structures are processed to identify candidate answer variants (CAVs).

In some illustrative embodiments, the structured portions of content are identified as being in association with portions of content in which primary search candidate answers are found, e.g., a document in which a primary search candidate answer is found contains a table data structure. However, in other illustrative embodiments. While the structured portion of content may be found during a primary search operation of the QA system pipeline 108, the structured portion of content need not be associated with a candidate answer found by the primary search operation, i.e. the structured portion of content may merely be encountered during the primary search operation whether or not being associated with a candidate answer or not. Moreover, it should be appreciated that, while shown as a separate CAV engine 120 from that of the cognitive system 100 and QA system pipeline 108 in FIG. 1, the CAV engine 120 may be integrated in the cognitive system 100 and/or QA system pipeline 108 without departing from the spirit and scope of the illustrative embodiments.

As shown in FIG. 1, in one or more illustrative embodiments, the candidate answer variation engine 120 comprises a structured content format analysis engine 122, an element grouping engine 124, and an element grouping similarity analysis engine 126. The operations performed by each of these engines will be described hereafter. However, it should be appreciated that any operations not specifically attributed to one of the engines 122-126 may be performed by other logic, not specifically depicted, which is implemented in the CAV engine 120.

The structured content format analysis engine 122 comprises the logic that performs operations for analyzing structured portions of content to determine the structure or format of the structured portion of content 122. These operations may involve looking to the underlying code, data content, and/or metadata associated with the structured portion of content. For example, if the structured content portion is provided in a HyperText Markup Language (HTML) document present in the corpus 130, the underlying HTML code of the structured content portion may be analyzed by the structured content format analysis engine 122 to extract information regarding the structure or format, e.g., row headers, column headers, cell values, and the like, of a table data structure identified during the primary search operation performed by the QA system pipeline 108. It should be appreciated that structured content portions may have complex structures and formatting, e.g., multi-level headers associated with rows and/or columns in a table data structure, and the structured content format analysis engine 122 performs the operations for identifying this structure and formatting and provides this information to the element grouping engine 124 for use in generating element groups. Moreover, such structure or formatting information may be provided to the element grouping similarity analysis engine 126 for use in determining the evaluation criteria (e.g., strict, relaxed, or a hybrid approach) to apply to element groupings when evaluating CAVs as discussed hereafter.

The element grouping engine 124 comprises the logic that, based on the structure information received from the structured content format analysis engine 122, generates groupings of elements of the structured content portion. As an example, consider a table data structure to be the structured content portion. The table data structure will have row headers and column headers as well as cell data values. This information may be provided as character strings, numerical values, alphanumeric content, or the like. The element grouping engine 124, in some illustrative embodiments, generates groupings of this information as a triad comprising a row header of a row in the table, a column header of a column in the table, and the corresponding cell data value present at the intersection of the row and column. This may be done for each such combination of row and column such that a plurality of groupings, or triads in this example, are generated for the table data structure. It should be appreciated that the particular grouping of elements used in any implementation of the present, invention is dependent upon the identified structure and the elements of that structure identified by the structured content format analysis engine 122. This includes identifying structural relationships between the identified elements that may be more or less complex than a row/column/cell value type relationship that is used as an example in the present description. Any structural relationship between elements identified through operation of the logic of a structured content format analysis engine 122 is intended to be within the spirit and scope of the present invention. For purposes of the present description, and by way of example, it will be assumed that the structured portion of content is a table data structure and that the structure comprises a row header, column header, and corresponding cell values.

It should be appreciated that in some table data structures, there may multiple levels of row and column headers, there may be three or more dimensional table data structures (comprising more than two dimensional row and column tables), or the like. In such cases, the groupings may be performed in accordance with the identified structure or formatting of the structured content portion. In the case of multiple row/column headers, for example, each grouping, or triad in the example, may have in the element representing the row/column header, a combination of the multiple levels of row/column header to which the particular grouping or triad corresponds. This may require a larger set of groupings or triads to be generated to cover all combinations of row/column headers and cell values, e.g., different groupings and triads for different combinations of various levels of headers. Any mechanism for rendering the structure or format of the structured content portion into a grouping or triad of elements for evaluation may be used without departing from the spirit and scope of the illustrative embodiments.

The groupings or triads generated by the element, grouping engine 124 are provided to the element grouping similarity analysis engine 126 which comprises the logic for performing the operations directed to evaluate the similarity of evidence present in the groupings or triads to features of an input question and select CAVs that are sufficiently similar to warrant further evaluation by the cognitive system 100 and/or QA system pipeline 108. As previously mentioned above, this evaluation may comprise the calculation of a similarity measure that evaluates the similarity of content of an element in the grouping or triad to content of a feature or set of features in the input question. This similarity measure may take many different forms depending upon the desired implementation, e.g., distance measurements indicative of similarity between terms in the element in the grouping with terms in the input question, various functions of correlations between the element and features of the input question including synonyms, antonyms, contraindications, defined associations between entity types, e.g., "director" and "boss," indicative of similarities, etc.

Various types of textual syntactic and/or semantic similarity measures may be utilized without departing from the spirit and scope of the illustrative embodiments. Examples of text similarity algorithms and resulting measures which may be used in conjunction with the mechanisms of the illustrative embodiments are described, for example, in Gomaa et al., "A Survey of Text Similarity Approaches," International Journal of Computer Applications, Volume 68, No. 13, Apr. 2013. As set forth in this document, text similarity approaches may include various string based similarity measures which may be categorized as either character-based similarity measures or term-based similarity measures. Character-based similarity measures include Longest Common SubString (LCS), Damerau-Levenshtein, Jaro, Jaro-Winkler, Needleman-Wunsch, Smith-Waterman, and N-gram algorithms. Term-based similarity measures include Block Distance, Cosine Similarity, Dice's Coefficient, Euclidean distance, Jaccard similarity, Matching Coefficient, and Overlap Coefficient. In addition, there are also a variety of corpus-based similarity measures including Hyperspace Analogue to Language (HAL), Latent Semantic Analysis (LSA), Generalized Latent Semantic Analysis (GLSA), Explicit Semantic Analysis (ESA), etc, Knowledge-based and hybrid similarity measures may also be utilized. While these various similarity measures are generally known as illustrated by the Gomaa et al. document, these similarity measures have not been previously utilized in combination with the other mechanisms of the illustrative embodiments to provide candidate answer variants from structured portions of content. As noted above, prior natural language processing based systems ignore structured portions of content, such as tables, when performing cognitive operations such as question answering and the like. The mechanisms of the illustrative embodiments may be used with any of these types of similarity measures, or other similarity measures, without departing from the spirit and scope of the illustrative embodiments. For purposes of illustration, illustrative embodiments described herein will utilize the Cosine Similarity term-based similarity measure.

In some illustrative embodiments, a textual similarity measure is utilized in which cosine similarity calculations on vectors representing the elements of the groupings and features of the input question are generated. That is, in natural language processing, it can be assumed that there is a vector V of length equal to the size of the vocabulary being utilized to perform the natural language processing (NLP), e.g., English, such that every word in the language is represented by a position within the vector V. A string listing L may be provided that represents a portion of natural language content, e.g., a sentence where strings are the words of the sentence, such that each string s in the list L is in the vocabulary (English in this example), The string listing L may be represented by the vector V, or a compressed form of the vector V, such that the position for each string s in vector V has the number of occurrences of the string s in the string listing L.

Given two string lists, e.g., L_1 and L_2, these sting lists may be presented by their corresponding vectors, e.g., vectors V_1 and V_2. The cosine similarity between these vectors may then be computed. As is generally known, the cosine similarity value can have a value in the range from −1 to 1, where −1 represents vectors that are diametrically opposed, 0 represents vectors that are 90 degrees to one another, and 1 represents vectors that have the same orientation. With regard to NLP and string comparison, if the cosine similarity is positive, i.e. greater than 0, then the two vectors V_1 and V_2 have at least one string in common. The closer the cosine similarity is to 1, the more strings that are common amongst the two vectors and thus, a higher likelihood or confidence that the string lists correspond. Thus, the cosine similarity between vectors representing strings in a portion of content may be used to determine a level of confidence that the information in one portion of content corresponds to the other portion of content. In the illustrative embodiments, this similarity measure may be performed between vectors representing groupings of elements, e.g., strings, in structured content portions and a vector representing the features, e.g., strings, present in an input question. The cosine similarity value may be evaluated against thresholds and similarity rules to determine whether the corresponding CAV should be maintained as a candidate answer to the input question for further evaluation by the cognitive system 100 and/or QA system pipeline 108.

In particular, each element of the grouping, e.g., triad, is a potential CAV for the input question. Thus, in order to evaluate the suitability of an element in the grouping as a CAV, the other elements of the group are evaluated with regard to calculating the similarity measure relative to the input question, e.g., the cosine similarity of the vector comprising these other elements and the vector representing the features of the input question. In other words, a first element of the grouping (hereafter the description will utilize the example of a triad for simplicity of the description) is taken as a candidate answer variant (CAV) to the input question and the other elements of the grouping are considered "evidence" for evaluating the CAV, and thus, are referred to herein as "evidence" elements. It should be noted that the elements that are selected as evidence elements will depend on which element is selected to be the CAV. Thus, for a single triad, this evaluation may be performed repeatedly with each iteration choosing a different element as the CAV. For example, in the case of a triad comprising {row header, column header, cell value} the evaluations will comprise first selecting the row header as the CAV and using the column header and cell value as evidence elements, second the column header is selected as the CAV, and third the cell value is selected as the CAV.

With regard to each of the evaluations performed for a given triad, similarity measures between a vector V1 representing the evidence elements and a vector V2 representing the features of the input question are calculated. The similarity measure, e.g., cosine similarity value, may then be compared to one or more similarity threshold values, evaluated by the application of one or more similarity rules, a combination of these, or the like, to determine if the two vectors are sufficiently' similar to warrant maintaining the CAV as a potential candidate answer for further evaluation by the cognitive system 100 and/or QA system pipeline 108. The similarity threshold values may represent a required level of confidence, or similarity, between the vectors for a conclusion that there is sufficient similarity indicative of the triad containing a potential answer to the input question. It should be appreciated that in some illustrative embodiments, this similarity threshold may be set to a value indicative of any positive value in the cosine similarity value is sufficiently similar, e.g., any non-zero value indicates a sufficiently high enough similarity between the two vectors.

The similarity rules may be used to specify a strict, relaxed, or hybrid approach to identifying CAVs for further evaluation by the cognitive system 100 and/or QA system pipeline 108. For example, in a strict CAV selection implementation, all of the CAVs associated with a triad must have a similarity measure that meets or exceeds the similarity threshold value. Hence, in an example where the triad comprises {row header, column header, cell value}, and with a threshold similarity value indicating any positive similarity value is sufficient, then the evaluation of CAV=row header, the evaluation of CAV=column header, AND the evaluation of CAV=cell value must all return a non-zero similarity. This means that each of the combinations of elements of the triad must exhibit some cosine similarity with the input question. In other implementations of the illustrative embodiments, a higher threshold similarity value may be required, such that the cosine similarity of each CAV evaluation must meet or exceed a value greater than zero, e.g., at least 0.2.

Whereas a strict CAV selection implementation utilizes an "AND" approach, the element grouping similarity analysis engine 126 may also, or alternatively, use a relaxed CAV selection implementation in which an "OR" approach is taken. With a relaxed CAV selection implementation, any of the CAV evaluations need only meet or exceed the similarity threshold value. Thus, for example, with a relaxed CAV selection implementation, and a similarity threshold value indicating any positive similarity is sufficient, any one of CAV=row header, CAV=column header, OR CAV=cell value need to generate a positive similarity, e.g., positive cosine similarity, with the input question. This relaxed CAV selection implementation may be useful in many different implementations and cases, such as when the table data structure comprises multi-level headers such as between the various levels of headers, as will be described hereafter with regard to the example in FIG. 4B.

In other implementations, a hybrid approach may be utilized in which strict CAV selection is utilized along with relaxed CAV selection under defined circumstances. For example, the particular selection logic to utilize may be dependent upon the structure of the structured content portion as determined by the structured content format analysis engine 122. For example, if the structure content portion comprises a table data structure in which multiple levels of row headers and/or multiple levels of column headers are utilized, or the table has more than two dimensions, then a relaxed CAV selection logic may be utilized with regard to the various levels of headers, e.g., if the triad comprises {row header, (column header 1, column header 2), and cell value} then the relaxed CAV selection may be performed between column header 1 and column header 2. For example, a first evaluation may be performed for CAV=column header 1 and a second may be CAV=column header 2. A relaxed CANT selection implementation may be used such that all that is required between these two CAVs is that at least one of them have a non-zero similarity value, e.g., cosine similarity value. Of course, in one illustrative embodiment, a strict CAV selection may then be used between the other possible CAVs, i.e. CAV=row header, CAV=cell value, such that both CAV=row header and CAV=cell value must have a non-zero similarity, but then only one of CAV=column header 1 and CAV=column header 2 need have a non-zero similarity.

As another alternative hybrid approach, a multi-pass implementation may be utilized in which a strict. CAV selection is used during an initial pass of all of the CAVs of all of the triads of the structured content portion are rejected as potential candidate answers, then a second pass may be used that implements the relaxed CAV selection. This approach may be used regardless of whether or not the table has a multi-level header format or structure, e.g., even in the case where the triads comprise {row header, column header, cell value}.

The result of the operation of the element grouping similarity analysis engine 126 is the generation of a listing of CAVs that can be used to augment the candidate answers generated by the QA system pipeline 108 during a primary search operation when processing an input question from a client computing device, e.g., client computing device 110 or 112 via network 102 and server 104A. These CAVs may be integrated into the processing of the QA system pipeline 108, such as at a hypothesis generation and/or hypothesis and evidence scoring stage of processing, for evaluation against a corpus or corpora of evidence passages to perform confidence scoring of the CAVs along with the other candidate answers. The result of such processing is a set of candidate answers (including the CAVs) with associated confidence scores and evidence passages. This set of candidate answers may be merged and ranked based on the confidence scores and a suitable final answer, or set of final answers, may be selected from the ranked listing for return to the source of the input question (e.g., client device 110 or 112) as an answer to the input question.

Thus, as discussed above, the illustrative embodiments provide mechanisms for identifying candidate answer variants (CAVs) from structured content portions in a corpus and evaluating the CAVs based on similarity measures to select a set of CAVs for inclusion in a set of candidate answers to an input question which are then evaluated using QA system mechanisms based on evidence present in the corpus or corpora. Through the use of the mechanisms of the illustrative embodiments, the performance of the QA system is improved by providing additional candidate answer variants for consideration.

FIG. 2 is a block diagram of an example data processing system in which aspects of the illustrative embodiments are implemented. Data processing system 200 is an example of a computer, such as server 104A or client 110 in FIG. 1, in which computer usable code or instructions implementing the processes for illustrative embodiments of the present invention are located. In one illustrative embodiment, FIG. 2 represents a server computing device, such as a server 104A, which, which implements a cognitive system 100 and QA system pipeline 108 augmented to include the additional mechanisms of the illustrative embodiments described hereafter.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. UM 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than tower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but stilt higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e, "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that, this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that, the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, a CAV engine 390 is provided which augments the operation of the QA system pipeline 300 by providing candidate answer variants (CAVs) obtained from structured content portions found during a primary search operation of the QA system pipeline 300 for further evaluation when answering the input question 310. As shown in FIG. 3, the question and topic analysis stage logic 320 may provide features of the input question 310 to the CAV engine 390 for use in generating a vector representation of the input question based on an established vector format for the particular vocabulary being utilized. For example, as noted above, when using natural language processing, a vector format for representing strings in a vocabulary may be used in which each position in the vector corresponds to a different string s in the vocabulary and each value indicates the number of instances of that string s. Thus, a vector representing the input question will have each position in the vector corresponding to a word in the input question having a non-zero value, with the value representing the number of instances of that string in the input question. Of course, a compressed version of this vector may be utilized as well such that large scale vectors need not be required.

As part of a primary operation of the QA system pipeline 300, the above described operations are performed to generate hypothesis for answering the input question 310. The hypothesis generation stage logic 340, while generating such hypotheses, or candidate answers, may encounter structured content portions in the corpus or corpora 345, 347. As a result, the hypothesis generation stage logic 340 may send a request to the CAV engine 390 to process the structured content portion to generate zero or more CAVs for further evaluation by the QA system pipeline 300 via stages 340-380. The CAV engine 390 performs the operations previously described above with regard to one or more of the illustrative embodiments of CAV engine 120 (with elements 392-396 operating in a similar manner to that of elements 122-126) in FIG. 1. That is, various vectors representing CAVs are generated based on the content and format/structure of the structured content portion and a similarity measure for each of these vectors may be computed with subsequent application of similarity threshold values and similarity rules and CAV selection logic (e.g., strict, relaxed, or hybrid). It should be appreciated that the calculation of the similarity measures, such as a cosine similarity, for example, may be performed with regard to the vector representing the input question as generated by the CAV engine 390 or question and topic analysis stage logic 320, for example.

Based on these operations, a CAV listing data structure 398 is generated by the CAN; engine 390 and provided back to the QA system pipeline 300, such as to hypothesis generation stage logic 340 in one illustrative embodiment. The CAV listing data structure 398 may be integrated into the data structures representing the candidate answers generated as part of the primary operation of the QA system pipeline 300 when processing the input question. As a result, the CAVs are evaluated along with the other candidate answers during the processing of stages 340-380 in the manner discussed above.

As noted above, the mechanisms of the illustrative embodiments operate on structured content portions which may have different structures or formats and may involve the application of different CAV selection logic, such as strict, relaxed, or a hybrid approach. To further illustrate these operations, consider the example table data structures shown in FIGS. 4A and 4B. The example diagrams of FIGS. 4A and 4B are representative of simple table data structures which may be present in documentation of a corpus and which may be utilized to generate answer variants in accordance with one illustrative embodiment.

FIG. 4A illustrates an example table data structure in which salaries and position information for a plurality of persons and for various years is presented. The table data structure shown in FIG. 4A utilizes a single level of row headers and single level of column headers. With a table data structure of the type shown in FIG. 4A, in one illustrative embodiment, a strict CAV selection logic implementation is utilized. Thus, for example, a first triad may be generated that comprises a row header, a column header, and a cell value corresponding to the intersection of the row and header, e.g., {John Smith, salary, $50,000.00}, {John Smith, position, engineer}, etc. Each triad represents a set of potential CAVs, e.g., CAV=john Smith, CAV salary, CAV=$50,000.00. For each CAV, the other elements are represented as vectors and used as a basis for performing a cosine similarity evaluation with the vector corresponding to the input question, e.g., "What was John Smith's salary?"

Thus, for example, when evaluating the CAV=$50,000.00, then the other elements John Smith and salary are evaluated against the input question. Hence, the CAV=$50,000.00 is only a valid CAV under strict CAV selection if the cosine similarity, as an example similarity measure, between the vectors of the other elements is greater than zero.

FIG. 4B illustrates an example table data structure in which profitability for a plurality of companies and for various years is presented. The table data structure shown in FIG. 4B utilizes a single level of row headers and multiple-level column headers (first level is "As of Dec. 31" and second level is the particular year. With a table data structure of the type shown in FIG. 4B, in one illustrative embodiment, a relaxed CAV selection logic implementation may be utilized. Thus, for example, a first triad may be generated that comprises a row header, the multiple column headers, and a cell value corresponding to the intersection of the row and headers, e.g., {Company ABC, ("As of Dec. 31", 2011), $165,000.00}. With this triad, a CAV, such as $165,000.00, is valid if the cosine similarity value, as one example of a similarity value, of "Company ABC" vs. the input question is greater than zero, and either the cosine similarity of "2011" or of "As of Dec. 31" vs. the input question is greater than zero.

Figure 5:
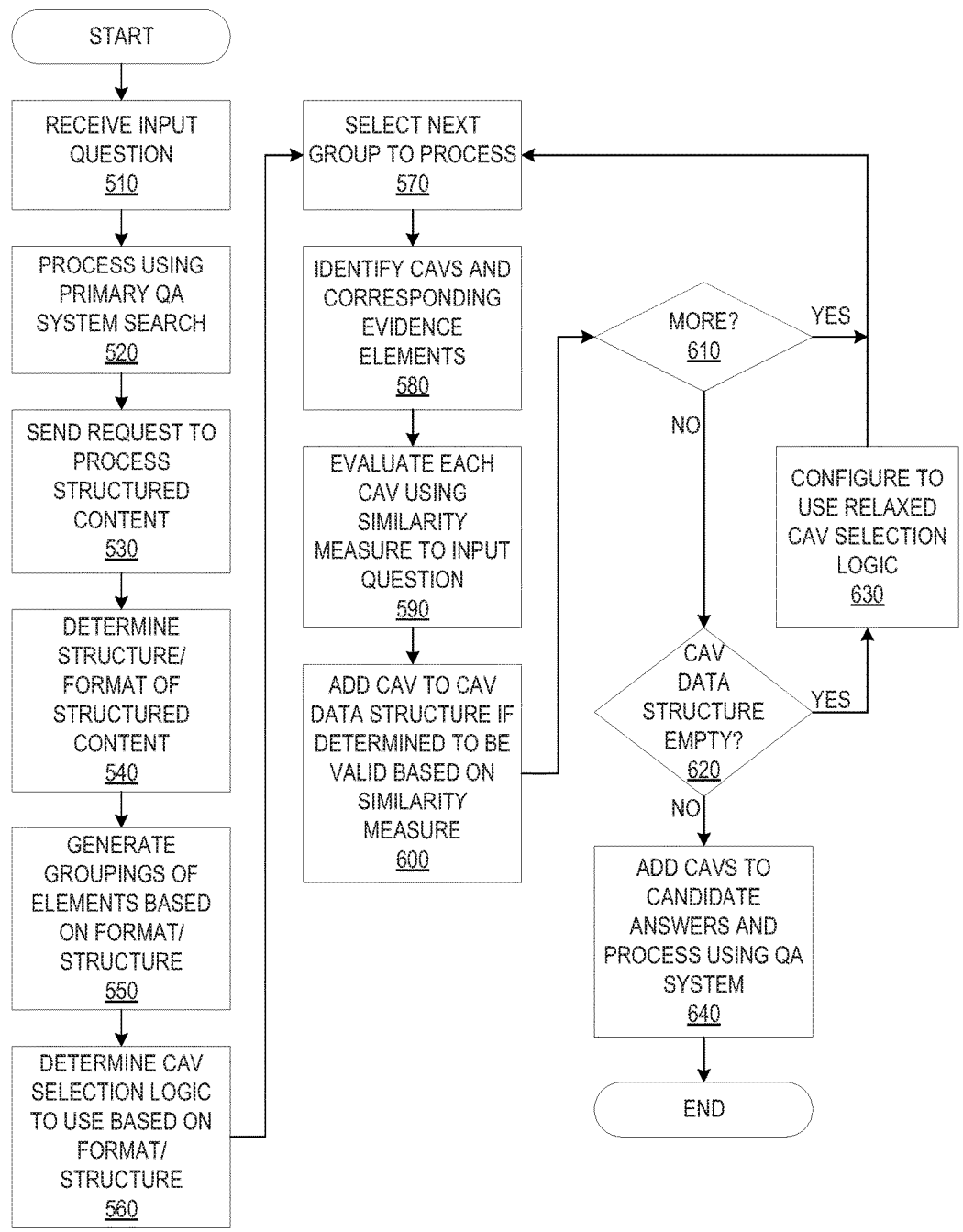
FIG. 5 is a flowchart outlining an example operation for generating answer variants in accordance with one illustrative embodiment.

FIG. 5 is a flowchart outlining an example operation for generating answer variants in accordance with one illustrative embodiment. As shown in FIG. 5, the operation starts by receiving an input question (step 510) which is then processed by a QA system pipeline as part of a primary search operation to generate a first set of candidate answers (step 520). The input question features are provided to the CAV engine along with a request to process a structured content portion associated with content in a corpus that is associated with a candidate answer found as part of a primary search operation of the QA system pipeline (step 530). The structure of the structured content portion is analyzed to identify the format/structure (step 540) and groupings of elements of the structured content portion are generated based on the format/structure (step 550). In addition, based on the format/structure, a CAV selection logic implementation is selected (step 560).

For a next grouping of elements (step 570), the CAVs and associated evidence elements are identified (step 580). Each CAV is evaluated using a similarity metric calculation based on a vector representation of the evidence elements and the vector representation of the input question features (step 590). As noted above, the evaluation may comprise applying one or more similarity threshold values and one or more rules associated with the CAV selection logic, e.g., strict, relaxed, or hybrid. If the CANT is determined to be valid, then it is maintained in a CAV data structure; otherwise it is discarded (step 600). A determination is made as to whether there are additional groupings of elements to be evaluated (step 610). If so, the operation returns to step 570. Otherwise, if there are no more groupings to evaluate, in response to the CAN; data structure being empty (step 620), a relaxed CAV selection logic is implemented (step 630) and the operation returns to step 570 with the first grouping being re-evaluated. Otherwise, the CAV data structure is output to the QA system pipeline for use in evaluating the CAVs along with the other candidate answers generated by the primary search operation of the QA system pipeline (step 640). The operation then terminates.

In view of the above, it can be appreciated that in one illustrative embodiment, a method is provided, in a data processing system comprising a processor and a memory, the memory comprising instructions executed by the processor to cause the processor to implement a candidate answer variant engine. The method comprises receiving, by the candidate answer variant engine, an indication of a structured portion of content in a corpus, generating, by the candidate answer variant engine, a plurality of groupings of elements of the structured portion of content, and generating, by the candidate answer variant engine, for each grouping of elements in the plurality of groupings of elements, and for each element in the grouping of elements, a corresponding grouping vector representation, corresponding to the element. The method further comprises, for each grouping vector representation of each grouping of elements in the plurality of groupings of elements: (1) performing, by the candidate answer variant engine, a similarity measure calculation between the grouping vector representation and a vector representation of an input question; and (2) selecting, by the candidate answer variant engine, an element corresponding to the grouping vector representation for inclusion as a candidate answer variant in a candidate answer variant data structure based on results of the similarity measure calculation. Moreover, the method comprises performing question answering operations for answering the input question based on an analysis of one or more candidate answer variants in the candidate answer variant data structure.

The structured portion of content may comprise a table data structure present in a portion of content of the corpus. In such embodiments, each grouping of elements in the plurality of grouping of elements may comprise a triad of at least one row header, at least one column header, and a cell content. This allows table data structures to be processed to identify candidate answer variants ((CVs) based on content present in headers and cells of the table data structure.

In some illustrative embodiments, the structured portion of content is a structured portion of content corresponding to a candidate answer found in the corpus by a primary search operation of a question answering (QA) system. In this way, the primary search operation of the QA system is able to focus CAV searching to those structured portions of content that are associated with other potential answers to the input question and thus, are more likely to provide CAVs.

In some illustrative embodiments, performing the similarity measure calculation comprises calculating a cosine similarity between the grouping vector representation and the vector representation of the input question. The similarity measure calculation may comprise calculating the cosine similarity between other elements of the grouping vector representation than an element of the grouping vector representation being considered for selection as a candidate answer variant from the grouping of elements. By utilizing cosine similarity measures, a measure of similarity between natural language elements may be used generated that provides good results in determining what elements of a structured portion of content are similar to elements of an input natural language content, such as an input question.

Selecting the element corresponding to the grouping vector representation for inclusion as a candidate answer variant in the candidate answer variant data structure based on results of the similarity measure calculation may comprise comparing a cosine similarity value calculated as the cosine similarity between the other elements of the grouping vector representation and the vector representation of the input question, with a threshold value, and selecting the element being considered for selection as a candidate answer variant to be a candidate answer variant in response to the cosine similarity value having a predefined relationship with the threshold value. In this way, these illustrative embodiments utilize cosine similarity to identify elements in the structured portion of content that are similar to the features of the input question and are likely potential answers to the input question.

In some illustrative embodiments, generating a plurality of groupings of elements of the structured portion of content may comprise analyzing at least one of metadata or computer code associated with the structured portion of content to identify a structure of the structured portion of content, identifying elements of the structure based on the analysis, and generating groupings of elements based on the identified elements and the identified structured of the structured portion of content. In this way, these illustrative embodiments leverage the structure information available in metadata and computer code to assist with the defining of groupings of elements used to identify candidate answer variants.

In some illustrative embodiments, the vector representation of the input question comprises a vector representation of one or more features of the input question identified by a natural language processing of the input question. Thus, the features may be represented in such a way that these features may be compared to elements of structured content to determine similarities using vector operations.

In some illustrative embodiments, the similarity measure calculation comprises at least one of a textual syntactic similarity measure calculation or textual semantic similarity measure calculation. Thus, the mechanisms of these illustrative embodiments may utilize various measures of textual syntactic similarity and/or textual semantic similarity to determine which elements of structured content are similar to features of an input question.

In some illustrative embodiments, performing question answering operations for answering the input question based on an analysis of one or more candidate answer variants in the candidate answer variant data structure may comprise: generating, for each candidate answer variant in the candidate answer variant data structure, a confidence score value indicating a confidence that a corresponding candidate answer variant is a correct answer for the input question; ranking the candidate answer variants relative to one another, and to other candidate answers found during a primary search operation of a question answering (QA) system, based on the generated confidence scores to generate a ranked listing data structure; selecting at least one final answer from the ranked listing data structure; and outputting the at least one final answer to a source of the input question. Thus, with these illustrative embodiments, the candidate answer variant mechanisms are used to augment the functionality of a QA system to facilitate performance of the QA system's operations on an expanded set of candidate answers that comprise candidate answer variants identified in structured content portions which otherwise would not have been available due to prior art limitations of natural language processing with regard to structured content portions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the method comprising:

configuring the processor, based on instructions loaded into the memory and executed by the processor, to implement a candidate answer variant engine, that operates in conjunction with a Question Answering (QA) cognitive computing system to generate an answer output in response to the QA cognitive computing system receiving an input question from a client computing device, wherein configuring the processor further comprises configuring the processor to implement an element grouping engine and an element grouping similarity analysis engine of the candidate answer variant engine;

receiving, by the candidate answer variant engine, from a QA processing pipeline of the QA cognitive computing system based on computerized natural language processing of the input question, an indication of a structured portion of content in a corpus of electronic content processed by the QA cognitive computing system to answer input questions;

generating, by the element grouping engine of the candidate answer variant engine, a plurality of groupings of elements of the structured portion of content;

generating, by the element grouping engine of the candidate answer variant engine, for each grouping of elements in the plurality of groupings of elements, and for each element in the grouping of elements, a corresponding grouping vector representation, corresponding to the element;

for each grouping vector representation of each grouping of elements in the plurality of groupings of elements:

performing, by the element grouping similarity analysis engine of the candidate answer variant engine, a similarity measure calculation between the grouping vector representation and a vector representation of the input question; and selecting, by the element grouping similarity analysis engine of the candidate answer variant engine, an element corresponding to the grouping vector representation for inclusion as a candidate answer variant in a candidate answer variant data structure based on results of the similarity measure calculation;

performing, by the QA cognitive computing system, question answering operations for answering the input question based on a cognitive analysis, by the QA processing pipeline of the QA cognitive computing system, of one or more candidate answer variants in the candidate answer variant data structure; and outputting, by the QA cognitive computing system, a final answer to the client computing device based on results of performing the question answering operations.

2. The method of claim 1, wherein the structured portion of content comprises a table data structure present in a portion of content of the corpus, and wherein each grouping of elements in the plurality of grouping of elements comprises a triad of at least one row header, at least one column header, and a cell content.

3. The method of claim 1, wherein the structured portion of content is a structured portion of content corresponding to a candidate answer found in the corpus by a primary search operation of the QA cognitive computing system.

4. The method of claim 1, wherein performing the similarity measure calculation comprises calculating a cosine similarity between the grouping vector representation and the vector representation of the input question.

5. The method of claim 4, wherein the similarity measure calculation comprises calculating the cosine similarity between other elements of the grouping vector representation than an element of the grouping vector representation being considered for selection as a candidate answer variant from the grouping of elements.

6. The method of claim 5, wherein selecting the element corresponding to the grouping vector representation for inclusion as a candidate answer variant in the candidate answer variant data structure based on results of the similarity measure calculation comprises:

comparing a cosine similarity value calculated as the cosine similarity between the other elements of the grouping vector representation and the vector representation of the input question, with a threshold value; and selecting the element being considered for selection as a candidate answer variant to be a candidate answer variant in response to the cosine similarity value having a predefined relationship with the threshold value.

7. The method of claim 1, wherein generating a plurality of groupings of elements of the structured portion of content comprises:

analyzing at least one of metadata or computer code associated with the structured portion of content to identify a structure of the structured portion of content;

identifying elements of the structure based on the analysis; and generating groupings of elements based on the identified elements and the identified structured of the structured portion of content.

8. The method of claim 1, wherein the vector representation of the input question comprises a vector representation of one or more features of the input question identified by the natural language processing of the input question.

9. The method of claim 1, wherein the similarity measure calculation comprises at least one of a textual syntactic similarity measure calculation or textual semantic similarity measure calculation.

10. The method of claim 1, wherein performing question answering operations for answering the input question based on an analysis of one or more candidate answer variants in the candidate answer variant data structure comprises:

generating, for each candidate answer variant in the candidate answer variant data structure, a confidence score value indicating a confidence that a corresponding candidate answer variant is a correct answer for the input question;

ranking the candidate answer variants relative to one another, and to other candidate answers found during a primary search operation of a question answering (QA) system, based on the generated confidence scores to generate a ranked listing data structure; and selecting the final answer from the ranked listing data structure.

11. A computer program product comprising a non-transitory computer readable medium having a computer readable program stored therein, wherein the computer readable program, when executed on a computing device, causes the computing device to:

configure the computing device, based on instructions loaded into a memory and executed by a processor of the computing device, to implement a candidate answer variant engine, that operates in conjunction with a Question Answering (QA) cognitive computing system to generate an answer output in response to the QA cognitive computing system receiving an input question from a client computing device, wherein configuring the computing device further comprises configuring the computing device to implement an element growing engine and an element grouping similarity analysis engine of the candidate answer variant engine;

receive, by the candidate answer variant engine, from a QA processing pipeline of the QA cognitive computing system based on computerized natural language processing of the input question, an indication of a structured portion of content in a corpus of electronic content processed by the QA cognitive computing system to answer input questions an indication of a structured portion of content in a corpus;

generate, by the element grouping engine of the candidate answer variant engine, a plurality of groupings of elements of the structured portion of content;

generate, by the element grouping engine of the candidate answer variant engine, for each grouping of elements in the plurality of groupings of elements, and for each element in the grouping of elements, a corresponding grouping vector representation, corresponding to the element, of each of the other elements in the grouping of elements;

for each grouping vector representation of each grouping of elements in the plurality of groupings of elements:

perform, by the element grouping similarity analysis engine of the candidate answer variant engine, a similarity measure calculation between the grouping vector representation and a vector representation of the input question; and select, by the element grouping similarity analysis engine of the candidate answer variant engine, an element corresponding to the grouping vector representation for inclusion as a candidate answer variant in a candidate answer variant data structure based on results of the similarity measure calculation;

perform, by the QA cognitive computing system, question answering operations for answering the input question based on a cognitive analysis, by the QA processing pipeline of the QA cognitive computing system, of one or more candidate answer variants in the candidate answer variant data structure; and output, by the QA cognitive computing system a final answer to the client computing device based on results of performing the question answering operations.

12. The computer program product of claim 11, wherein the structured portion of content comprises a table data structure present in a portion of content of the corpus, and wherein each grouping of elements in the plurality of grouping of elements comprises a triad of at least one row header, at least one column header, and a cell content.

13. The computer program product of claim 11, wherein the structured portion of content is a structured portion of content corresponding to a candidate answer found in the corpus by a primary search operation.

14. The computer program product of claim 11, wherein performing the similarity measure calculation comprises calculating a cosine similarity between the grouping vector representation and the vector representation of the input question.

15. The computer program product of claim 14, wherein the similarity measure calculation comprises calculating the cosine similarity between other elements of the grouping vector representation than an element of the grouping vector representation being considered for selection as a candidate answer variant from the grouping of elements.

16. The computer program product of claim 15, wherein selecting the element corresponding to the grouping vector representation for inclusion as a candidate answer variant in the candidate answer variant data structure based on results of the similarity measure calculation comprises:

comparing a cosine similarity value calculated as the cosine similarity between the other elements of the grouping vector representation and the vector representation of the input question, with a threshold value; and selecting the element being considered for selection as a candidate answer variant to be a candidate answer variant in response to the cosine similarity value having a predefined relationship with the threshold value.

17. The computer program product of claim 11, wherein generating a plurality of groupings of elements of the structured portion of content comprises:

analyzing at least one of metadata or computer code associated with the structured portion of content to identify a structure of the structured portion of content;

identifying elements of the structure based on the analysis; and generating groupings of elements based on the identified elements and the identified structured of the structured portion of content.

18. The computer program product of claim 11, wherein the vector representation of the input question comprises a vector representation of one or more features of the input question identified by the natural language processing of the input question.

19. The computer program product of claim 11, wherein the similarity measure calculation comprises at least one of a textual syntactic similarity measure calculation or textual semantic similarity measure calculation.

20. An apparatus comprising:

a processor; and a memory coupled to the processor, wherein the memory comprises instructions which, when executed by the processor, cause the processor to:

configure the processor to implement a candidate answer variant engine, that operates in conjunction with a Question Answering (QA) cognitive computing system to generate an answer output in response to the QA cognitive computing system receiving an input question from a client computing device, wherein configuring the processor further comprises configuring the processor to implement an element grouping engine and an element grouping similarity analysis engine of the candidate answer variant engine;

receive, by the candidate answer variant engine, from a QA processing pipeline of the QA cognitive computing system based on computerized natural language processing of the input question, an indication of a structured portion of content in a corpus of electronic content processed by the QA cognitive computing system to answer input questions an indication of a structured portion of content in a corpus;

generate, by the element grouping engine of the candidate answer variant engine, a plurality of groupings of elements of the structured portion of content;

generate, by the element grouping engine of the candidate answer variant engine, for each grouping of elements in the plurality of groupings of elements, and for each element in the grouping of elements, a corresponding grouping vector representation, corresponding to the element, of each of the other elements in the grouping of elements;

for each grouping vector representation of each grouping of elements in the plurality of groupings of elements:

perform, by the element grouping similarity analysis engine of the candidate answer variant engine, a similarity measure calculation between the grouping vector representation and a vector representation of the input question; and select, by the element grouping similarity analysis engine of the candidate answer variant engine, an element corresponding to the grouping vector representation for inclusion as a candidate answer variant in a candidate answer variant data structure based on results of the similarity measure calculation;

perform, by the QA cognitive computing system, question answering operations for answering the input question based on a cognitive analysis, by the QA processing pipeline of the QA cognitive computing system, of one or more candidate answer variants in the candidate answer variant data structure; and output, by the QA cognitive computing system, a final answer to the client computing device based on results of performing the question answering operations.

* * * * *